United States Patent [19]
Terry

[11] 3,738,700
[45] June 12, 1973

[54] COMBINATION BABY CARRIAGE AND PLAYPEN

[76] Inventor: Stephen Terry, 1170 Ocean Parkway, Brooklyn, N.Y. 11230

[22] Filed: Sept. 1, 1971

[21] Appl. No.: 176,931

[52] U.S. Cl.................. 296/27, 280/30, 280/34 C
[51] Int. Cl............................................. B60p 3/34
[58] Field of Search................ 280/34 R, 34 C, 30, 280/31, 37, 39, 41 R, 42; 296/26, 27

[56] References Cited
UNITED STATES PATENTS

| | | | |
|---|---|---|---|
| 2,134,904 | 11/1938 | Bacon | 280/30 |
| 3,162,460 | 12/1964 | Davidson | 280/31 |
| 2,186,368 | 1/1940 | Conger | 280/42 |

*Primary Examiner*—Leo Friaglia
*Assistant Examiner*—Robert R. Song
*Attorney*—Bauer & Amer

[57] ABSTRACT

A baby carriage which converts into a playpen by lateral movement of the opposite sides thereof, and including crossing support members beneath the main or medial body section that are spring-biased to assist in said lateral movement of the sides. Said crossing support members are also advantageously located in supporting relation to the bottom wall of the main body section.

3 Claims, 5 Drawing Figures

PATENTED JUN 12 1973

INVENTOR
STEPHEN TERRY

BY Bauer & Amer
ATTORNEYS

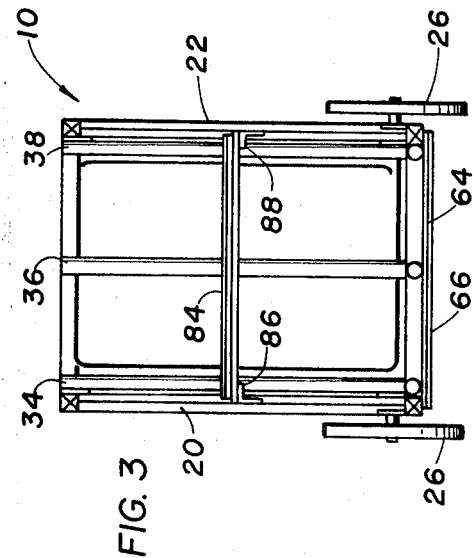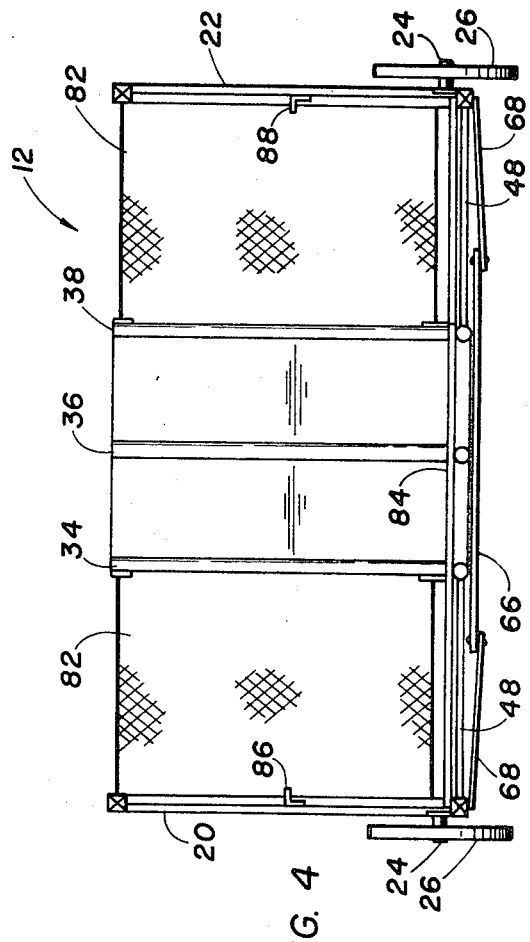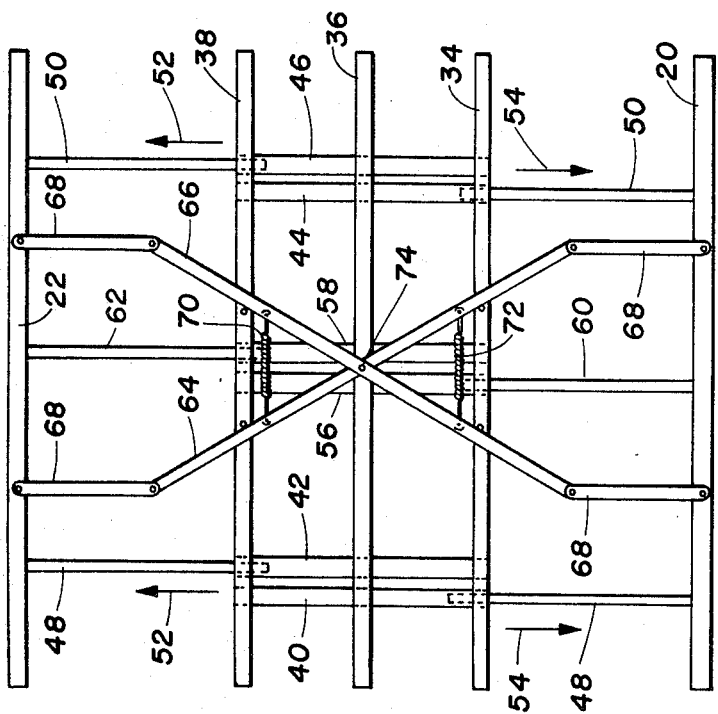

COMBINATION BABY CARRIAGE AND PLAYPEN

The present invention relates to a baby carriage which converts into a playpen.

There have been numerous attempts, as exemplified by U.S. Pat. Nos. 2,604,333 and 2,967,059, to provide a single construction which functions effectively as a baby carriage and as a playpen thereby eliminating the need for two separate constructions for each of these functions. This provides an obvious convenience since it saves not only the expense of a separate baby carriage and playpen but also results in a substantial saving in storage space necessary for each of these separate units. However, such known prior art constructions are not entirely satisfactory. In most instances, it is too difficult to force the baby carriage parts through expanding movement so that the larger volume required for playpen purposes is bounded by these parts. In other instances, the expanded construction lacks rigidity and strength, particularly in its medial portion.

Broadly, it is an object of the present invention to provide an improved combination baby carriage and playpen overcoming the foregoing and other shortcomings of the prior art. Specifically, it is an object to provide a unitary construction to serve both as a baby carriage and a larger playpen in which crossing support members advantageously assist in the expansion movement and also support the middle of the expanded construction.

A combination baby carriage and playpen demonstrating objects and advantages of the present invention uses, to dual advantage, a scissors-type crossing arrangement of support members which are spring-biased to project the carriage sides outwardly to their playpen-bounding positions when partaking of scissors-type movement and which, by virtue of their crossing position beneath the bottom wall of the playpen, have a supporting relation to said bottom wall.

The above brief description, as well as further objects, features and advantages of the present invention, will be more fully appreciated by reference to the following detailed description of a presently preferred, but nonetheless illustrative embodiment in accordance with the present invention when taken in conjunction with the accompanying drawings, wherein:

FIG. 3 is a sectioned front elevational view showing the cooperative relation of the parts of the device when serving as a baby carriage;

FIG. 4 is a view similar to FIG. 3, but showing the cooperation of the parts when arranged to provide a playpen; and FIG. 5 is a bottom plan view illustrating the floor of the playpen.

Figure 1:
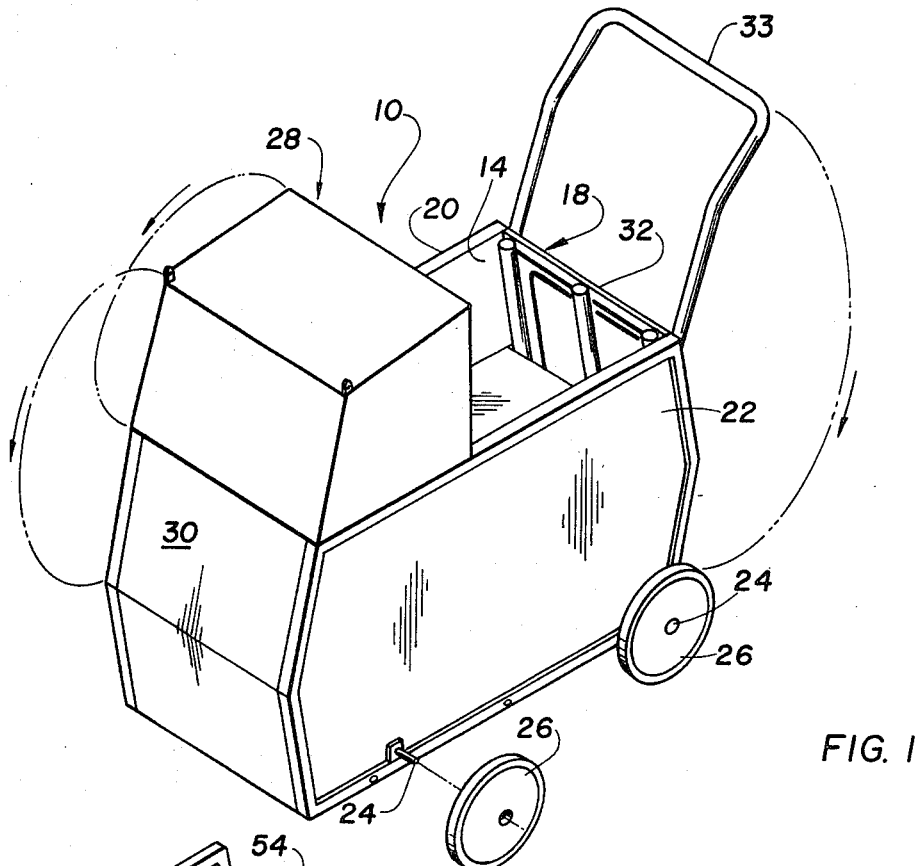
FIG. 1 is a perspective view of the device according to the invention illustrated in its compact condition wherein it functions effectively as a baby carriage.
Figure 2:
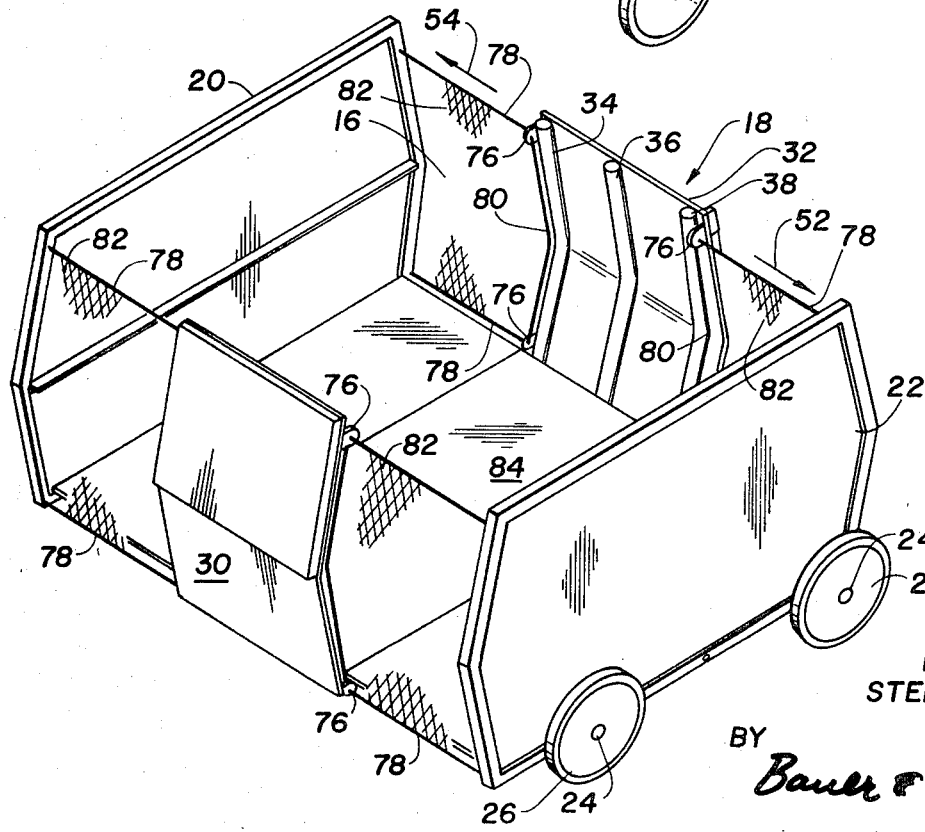
FIG. 2 is also a perspective view of the device, but illustrating the same in its expanded and enlarged condition in which it effectively functions as a playpen.

Reference is now made to the drawings, and in particular to FIGS. 1 and 2 which respectively show the device hereof set up as a baby carriage 10 (FIG. 1) and as a playpen 12 (FIG. 4). In converting from the baby carriage 10 to the playpen 12, the structure is expanded from a starting condition in which it bounds a comparatively small space 14 which is sufficient for the requirements of a baby carriage into a comparatively larger space 16 which is sufficient for the requirements of a playpen.

The foregoing conversion is achieved utilizing a middle or main body section, herein generally designated 18. Main section 18 cooperates with two opposite side sections 20 and 22 to provide the baby carriage 10, all as is clearly shown in FIG. 1. Consistent with use as a baby carriage, the main section 18 has horizontally oriented front and rear axles 24 on which wheels 26 are appropriately journaled for rotation. Although not shown, it will be understood that associated with at least one of the wheel 26 is a braking mechanism which is effective to prevent rotation thereof and thus maintain the carriage 10 stationary. The same braking mechanism is, of course, effective to prevent rolling movement of the playpen 12.

Completing the construction of the baby carriage 10 is a hood 28 which can be unfolded from a compact condition along the top edge of an end wall 30 into an erect condition as illustrated in FIG. 1. In an essentially similar fashion, a handle bar 32 is pivotally mounted to the opposite end wall 32 of the main section 18 and is pivotal between an out-of-the-way storage condition against the end wall 32 and an operative condition in which it is used to push the baby carriage 10.

Having reference now specifically to FIG. 2 and FIG. 5, it will be noted that the main body section 18 includes three pipe-like members 34, 36 and 38 which are arranged lengthwise, in substantially parallel relationship, of the unit 18 and which provide structural stability to this unit. As is most clearly illustrated in FIG. 5, arranged transversely across the front and rear of the members 34, 36 and 38 are pairs of cylindrical, pipe-like members 40, 42 and 44, 46. Each of the previously noted sides 20 and 22 have at front and rear locations transversely oriented rods 48 and 50 which are slidably disposed in a cooperating one of the pipes 40, 42 and 44, 46. As a consequence, the sides 20 and 22 are readily expanded from positions adjacent the members 34 and 38 which, as previously noted, bound the small baby carriage space 14 in opposite directions 52 and 54 to remote locations that bound the comparative large playpen space 16.

Supplementing the structural strength of the medial portion of the device are a pair of pipes 56 and 58 which slidably accommodate centrally located rods 60 and 62 connected to medial portions of each of the sides 20 and 22. Further, to facilitate outward sliding movements 52 and 54 of the sides 20 and 22, there is provided a scissors-like arrangement of links 64 and 66 which, at opposite ends, are connected via links 68 to each of the sides 20 and 22. Helical springs 70 and 72 are connected on opposite sides of the pivot 74 of the links 64 and 66 and function, in an obvious manner, to draw the links together and thereby urge the sides 20 and 22 through the sliding movements 52 and 54.

Although not shown, it will be understood that the sides 20 and 22 are adapted to be latched in their positions adjacent the sides 34 and 38 when they provide the baby carriage 10 and that unlatching of the sides is effective in producing outward sliding movements 52 and 54 of these sides under the urgency of the springs 70 and 72.

FIGS. 2, 3 and 4 illustrate further structural details of the device hereof which facilitate the previously noted tracking movements 52 and 54 of the sides 20 and 22. Specifically, this structure includes lateral projections 76 arranged on the ends 30 and 32 of the main unit 18 and each of which slidably accommodates horizontally oriented frame members 78 connected to each of the sides 20 and 22. These horizontal frames are joined at their remote ends by vertically oriented frames 80. A web material 82 is advantageously arranged in the frame 78, 80 and cooperates with the sides 20 and 22 and main section 18 to form a barrier confining the child to the enlarged interior space 16. Naturally, once the playpen construction 12 is erected, an appropriate unfolding arrangement of panels serving as a floor 84 is adapted to be placed within the space 16 in a supported condition upon pipes or frame members 34, 36 and 38.

As is perhaps best illustrated in FIG. 3, when the device provides the baby carriage 10, the floor 84 is then advantageously folded into its illustrated compact folded condition and arranged in a position straddling side mounting brackets 86 and 88 which are each appropriately mounted on the sides 20 and 22.

From the foregoing, it should be readily appreciated that there has been described herein a noteworthy device which, in one condition of its parts, effectively serves as a baby carriage 10 and in another expanded condition thereof effectively serves as a playpen 12. Moreover, among other noteworthy features the scissors-type action of the links or support members 64 and 66 provide a mechanical advantage, under the urgency of the springs 70, 72, in projecting the sides 20 and 22 through lateral sliding movement. Additionally, the crossing relation of the members 64 and 66 beneath the floor structure of the playpen 12 contributes to the structural stability of this floor structure, particularly in the medial area of the playpen 12.

A latitude of modification, change and substitution is intended in the foregoing disclosure, and in some instances some features of the invention will be employed without a corresponding use of other features. Accordingly, it is appropriate that the appended claims be construed broadly and in a manner consistent with the spirit and scope of the invention herein.

What is claimed is:

1. A combination baby carriage and playpen comprising a medial body section having a bottom wall, a pair of opposite side body sections transversely slidable between two operative positions respectively adjacent and remote from said medial body section and cooperating therewith to bound a first volume serving as a baby carriage in said adjacent position and a second volume of greater extent serving as a baby playpen in said remote position, plural hollow tubes transversely oriented on said medial body section and in spaced relation to each other, a tube slidably disposed in a cooperating one of said hollow tubes connected to said side body sections so as to guide said body sections in said transverse sliding movement, a pair of crossing support members pivotally mounted at their point of intersection to said medial body section and at their free ends to said body side sections operatively effective to both contribute to the urging of said side body sections through said transverse movement and to supporting said medial body section bottom wall, and springs connected between said crossing support members so as to bias said support members in pivotal movement causing transverse sliding movement of said side body sections.

2. A combination baby carriage and playpen as defined in claim 1 including netting connected between said side body sections and said medial body seection that is drawn taut by the transverse sliding movement of said side body sections relative to said medial body section.

3. A combination baby carriage and playpen comprising a medial body section having a bottom wall and front and rear walls, plural hollow tubes transversely oriented on said bottom wall of said medial body section in spaced relation to each other, a pair of sides for said medial body section having tubes connected thereto operatively supported for sliding movement on said medial body section with said tubes slidably disposed in a cooperating one of said hollow tubes, netting connected between said sides and said medial body section front and rear walls adapted to be drawn taut incident to sliding movement of said sides, a pair of crossing support members pivotally mounted at their point of intersection to said medial body section and at their free ends to said sides operatively effective to both contribute to the urging of said sides through said transverse movement and to supporting said medial body section bottom wall, and springs connected between said crossing support members so as to bias said support members in pivotal movement causing transverse sliding movement of said sides.

* * * * *